United States Patent [19]
Robinson et al.

[11] Patent Number: 5,734,838
[45] Date of Patent: Mar. 31, 1998

[54] DATABASE COMPUTER ARCHITECTURE FOR MANAGING AN INCENTIVE AWARD PROGRAM AND CHECKING FLOAT OF FUNDS AT TIME OF PURCHASE

[75] Inventors: W. Brent Robinson; Erin M. Mendez; Brenda K. Hale; Laurie A. Johnson, all of Irvine; Faris D. Weber, Stockton, all of Calif.

[73] Assignee: American Savings Bank, F.A., Irvine, Calif.

[21] Appl. No.: 486,681

[22] Filed: Jun. 7, 1995

Related U.S. Application Data

[63] Continuation-in-part of Ser. No. 434,732, May 4, 1995.
[51] Int. Cl.[6] .................................................. G06F 151/00
[52] U.S. Cl. ........................ 395/214; 395/239; 395/243
[58] Field of Search ............................ 364/401 R, 405, 364/406; 395/214, 205, 201, 216, 239, 240, 243; 902/8, 22; 340/825.35

[56] References Cited

U.S. PATENT DOCUMENTS

| | | | |
|---|---|---|---|
| 4,833,607 | 5/1989 | Dethloff et al. | 364/401 R |
| 4,885,685 | 12/1989 | Wolfberg et al. | 364/401 R |
| 5,025,372 | 6/1991 | Burton et al. | 364/401 R |
| 5,056,019 | 10/1991 | Schultz et al. | 364/401 R |
| 5,117,355 | 5/1992 | McCarthy | 364/401 R |
| 5,287,268 | 2/1994 | McCarthy | 364/401 R |
| 5,297,026 | 3/1994 | Hoffman | 364/401 R |
| 5,537,314 | 7/1996 | Kanter | 364/406 |

FOREIGN PATENT DOCUMENTS 6-131562  8/1910  Japan .

OTHER PUBLICATIONS

Moore, "Technology Explosion Shapes Marketing's Future", Bank Marketing, v24n5 pp:24–27, May 1992, Dialog file 15, Acc. No. 00615749.

Arndorfer, "More groups enhance credit cards to get up to speed in a tight race (credit unions offer premotions) ", American Banker, v160, n174, p. 22(1) , Sep. 11, 1995, Dialog file 148, Acc. No. 08123473.

"Supermarket Update: Bank One Ready to Unite Electronic Payments with Vision value Shopper Cards", POS News, Sep. 1, 1993, Dialog file 16, Acc. No. 04590660.

"A little Battle Royal in the UK", Credit Card Management, Nov. 1994, p. 90, Dialog file 16, Acc. No. 05388649.

"Frequent-Shopper Plans Get a Chipper Look", POS News, Jan. 3, 1995, Dialog file 636, Acc. No. 02630357.

(List continued on next page.)

*Primary Examiner*—Gail O. Hayes
*Assistant Examiner*—Frantzy Poinvil
*Attorney, Agent, or Firm*—Lowe, Price, LeBlanc & Becker

[57] ABSTRACT

In an advanced intelligent network based information distribution system including a central office switching system connected to communication lines including at least one service switching point for selectively providing switched communications between the communication lines, a network controller arranged for selectively providing control data to effect land line communications, and arranged separately from the central office switching system, an incentive award computer system provides an award to users participating in an incentive award program. The incentive award computer system includes a request transaction processing computer system receiving an electronic transaction by a user, determining whether the electronic transaction is a reward eligible transaction, and generating a transaction request when the electronic transaction is determined to be the reward eligible transaction. In addition, a points calculator processing computer system is provided that determines a reward responsive to the reward eligible transaction represented in the transaction request, assigns the reward to a user record responsive to reward criteria, and generates a reward record representing the reward. The incentive award computer system further includes a points assigning and reporting processing computer system that generates reports and provides access to the user record and the reward by the user responsive to predetermined criteria.

29 Claims, 9 Drawing Sheets

OTHER PUBLICATIONS

Fickenscher, "Star bank in Cincinati offering air miles perk . . . ", American Banker, v159, n176, p. 23(1) , Dialog file 148, Acc. No. 07816374.

Kleege, Stephen discloses an article entitled "In star Bank's flexible flier program, any airline will do", American Banker, v159, n1, p. 12(1) , Jan. 3, 1994. Dialog file 148, Acc. No. 07161362.

"Bank of Hawaii offers travel bonus", Honolulu Adviser (Honolulu, HI, US) p. C1, Mar. 14, 1996. Dialog file 635, Acc. No. 0690801.

"Business Travel: Airline perks in peril . . . ", Financial Times (London) Jul. 11, 1994, p. 14, Dialog file 16, Acc. No. 05160615.

"Another chance for Chip cards", Smart cards may be ready to make headway in card-based payment systems, Credit Card Management, Sep., 1993, p. 30. Dialog file 16, Acc. No. 04679883.

"Point Blank Video Library: Uses 'Video Incentive Program' to boost videw rentals", Video Store, Mar. 20, 1992, p. 46, Dialog file 16, Acc. No. 03701747.

"Debit Card News Debit Issuer Flies Right with Reward Plan", Bank Networ News, Jan. 27, 1995, Faulkner & Gray, Inc., Dialog file 636, Acc. No. 02657159.

5,734,838

DATABASE COMPUTER ARCHITECTURE FOR MANAGING AN INCENTIVE AWARD PROGRAM AND CHECKING FLOAT OF FUNDS AT TIME OF PURCHASE

RELATED APPLICATION

This application is a continuation-in-part application of application, Ser. No. 08/434,732, filed May 4, 1995 now pending.

This application is related to U.S. patent application Ser. No. 08/480,363 filed on Jun. 7, 1995 now pending.

1. Technical Field

The present invention relates to distributed data base computer architecture for managing an incentive award program, and more particularly to a distributed data base computer architecture managing an incentive award program using a public switched telephone network.

2. Background Art

Various incentive programs have been provided to promote the sales of products and services. Rules are generally established to determine when awards are earned by individuals who have accumulated a sufficient amount predetermined goals or objectives. For example, incentive programs have awarded a certain number of points to individuals participating therein for selling a designated dollar volume or quantity of products. When the participant accumulates a predetermined number of points during a certain time period, the participant is eligible for an award. The value of the award may also increase with increasing number of accumulated points. Previously, these accumulated points have been used to purchase merchandise illustrated in a company catalogue, or to earn, for example, vacations. In some situations, the points are converted to a direct cash equivalent which is distributed to the individual at predetermined time periods.

Various drawbacks to existing incentive programs exist. For example, some incentive programs award actual merchandise. The catalog of such an incentive program generally permits and makes available only a limited number of preselected merchandise items to be selected. The provider of such an award program (or program supporting entity) will have its own warehousing facilities for storing the merchandise therein. The program supporting entity purchases the merchandise from manufacturers or distributors, and must maintain a sufficient inventory in its warehouse to fill anticipated award demands.

The program supporting entity will arrange for the offering of the merchandise using circulars or magazines illustrating the merchandise currently inventoried by the program supporting entity. When an individual achieves a predetermined goal which makes the individual eligible for the award of merchandise, the individual is generally limited to the merchandise illustrated in the magazine or circular. According to this form of incentive program, the program supporting entity is required to outlay significant sums of money to inventory the merchandise and to maintain warehouses, etc. The inventoried merchandise might be over estimated resulting in excess amounts of inventoried merchandise. On the other hand, if the supporting entity does not stock a sufficient amount of merchandise, the individuals that have achieved the award may not in fact be awarded, resulting in dissatisfaction with the supporting entity. Thus, where the supporting entity maintains an inventory of merchandise which are utilized for the reward, the supporting entity runs great risk of expenses in maintaining warehouse facilities, maintaining sufficient inventory and not over estimating inventory. Thus, this type of incentive program requires huge initial investments with very uncertain benefits.

In another type of incentive program that awards merchandise, the supporting entity does not maintain its own inventory of merchandise. The supporting entity arranges with other suppliers or distributors to fulfill the needs of individuals that are eligible for the rewards. In this situation, an additional layer of merchandise handling is imposed which may cause significant delay in shipment of the merchandise to the individual or even mistakes caused by this additional communication layer. According to this type of incentive program, the supporting entity pays the suppliers or distributors of the merchandise a premium for maintaining and managing a significant portion of the incentive program.

As a result of some of the drawbacks of incentive programs, the prior art has attempted to establish more improved types of incentive programs. For example, U.S. Pat. No. 5,025,372 issued to Burton et al. provides an incentive award program which focuses on the issuance of credit instruments to participants in the program. The incentive award program in Burton et al. uses computer processing, programming and printing for the assignment and issuance of such credit instruments including monetary amounts awarded to the participants for use in the participant's credit instrument account. Participants identifying information and credit instrument account numbers are stored in memory. The incentive program can then be divided into multiple time periods. The levels of performance are calculated and assigned for each participant for a monetary amount to be available for expenditure through the participant's credit instrument. The trade name or trademark of the company sponsoring the incentive program may also appear on the physical credit instrument and on statements provided to participants. Messages printed on the reports themselves or on other documents mailed to participants stimulate and encourage the participants to perform under the incentive program. Burton et al., however, does not relate to the practical implementation of such an incentive award program. Burton et al. merely relates to the issuing of the credit instruments. That is, Burton et al. does not provide any specific computer architecture to accomplish these objectives. Further, Burton et al. is related to the issuing of credit instruments for the attainment of a pre-specified level of performance. In addition, one of the goals of Burton et al. is for the incentive award company to receive a payment from a supporting entity of the award program for the implementation of such a program. That is, in Burton et al., the incentive award providing company is required to provide such a program. Further, the incentive award program in Burton et al. merely encourages participants to perform activities to achieve the predetermined level of performance. Burton et al. is not capable of using such a reward program to strategically structure specific products or services to be offered by the supporting entity. Thus, from the supporting entity's perspective, Burton et al. contains significant disadvantages.

Another prior art solution has been to accumulate consumer cash value for multiple purchases from different merchants. This type of solution is illustrated in U.S. Pat. No. 5,117,855 to McCarthy. In McCarthy, a consumer, upon making a purchase from a merchant will obtain a credit value equal to a portion of the amount of the purchase. The portion which is to be credited is determined at the time of sale based on a rate which may be selected by that merchant irrespective of the rate selected by other merchants and independent of a central authority. Alternatively, the rate may be based in whole or in part upon a pre-assigned rebate or coupon value such as from a third party, or a combination of pre-assigned and merchant selected factors. The credit value is then transmitted to a central system communicating with all the participating merchants, whereat the credit value is added to a cash value maintained for that consumer's account. At pre-selected intervals, such as on the occasion of the consumer's birth date, that consumer is given access to cash in an amount equal to the accumulated cash value. The credit value may also be added to a bill value maintained in an account for the involved merchant. The merchant may be periodically billed the accumulated bill value amount where consumer credit values are discounts or rebates from the merchant.

In McCarthy, a credit value is determined based either upon a coupon or rebate value amount input by the merchant at the time of sale and/or upon the amount of the sale and the credit rate as input by the merchant. The determining credit value is then transmitted to the central system along with the consumer's account number and birth date whereat the credit value is added to the cash value maintained in the consumer account associated with the unique account number and the birth date. The consumer may then access the money through an electronic terminal for dispensing funds such as a bank terminal or the like which communicates with the central system to issue funds when the authorization is present. Alternatively, the central system may issue checks to the consumers.

Accordingly, the computer system in McCarthy encourages the usage of point of sale transactions with merchants using this type of reward program. Thus, McCarthy relates to point of sale transactions for credit types of accounts where account holders do not maintain balances to cover or support these point of sale transactions. Further, McCarthy does not distinguish between various types of customer accounts such as non-credit transaction intensive accounts such as a checking account versus non-credit transaction static type accounts such as a savings account. Thus, from the perspective of the supporting entity, McCarthy is ineffective for providing a comprehensive incentive award program.

We have discovered that from an economic viewpoint, it is much more advantageous to promote and utilize transaction intensive customer accounts wherein fund balances are maintained as opposed to non-transactional intensive accounts or credit-type accounts where no such fund balance is maintained for use by the administrating institution.

In addition, we have also discovered that associated with the use of transaction intensive accounts, it is advantageous to provide incentives to encourage electronic type transactions as opposed to manual type transactions. That is, we have discovered the ability or catalyst to discourage manual type transactions which are frequently used in a transaction intensive customer account. As a result, we have discovered unexpectedly that these types of incentives are graciously welcomed by customers and that manual type transactions are significantly reduced. For example, we have discovered that manual transactions for a customer checking account are significantly reduced in favor of electronic transactions.

Consequently, the intensive operations required to process manual transactions may be significantly reduced while electronic transactions are increased. Advantageously, we have discovered that customers will accept debit type electronic transactions with the transaction intensive account.

Thus, we have discovered that the administering institution is able to more efficiently process customer transactions while also eliminating "float" charges previously experienced by the administering institution for extending credit for manual transactions.

We have also discovered that there is a need and advantage to transfer assets from transaction static accounts to transaction intensive accounts to obtain the benefits resulting therefrom, and to concentrate assets in transaction intensive accounts that are more active and that will generate or require administering institution services.

We have further discovered the importance of the transaction intensive accounts in order to create an anchor or foundation for interaction with the customer associated with the administrating institution. In this connection, it is advantageous to provide customers with transaction intensive account services so that the customer will constantly and periodically identify or recognize the administrating institution which is administering the customer accounts. Further, since the customer receives periodic notices from the administering institution regarding the transaction intensive accounts, the administering institution is able to further obtain additional customer contact via literature and brochures which are accompanied in the notices.

We have further discovered that in order to accomplish the above features and advantages that have been discovered to be desirable, that a unique computer architecture and process is necessary to expediently and efficiently implement the above requirements.

DISCLOSURE OF THE INVENTION

It is an object of the present invention to provide a computer architecture and process to implement an incentive award program to better utilize transaction intensive customer accounts wherein fund balances are maintained as opposed to nontransactional intensive accounts or credit-type accounts where no such fund balance is maintained for use by the administrating institution.

It is another object of the present invention to provide a computer architecture and process to implement an incentive award program that provides incentives to encourage electronic type transactions as opposed to manual type transactions. One particular award that the present invention provides is the award of a free airline ticket when a sufficient amount of points have been accumulated by the individual participating in the incentive award program.

It is another object of the present invention to provide a computer architecture and process to implement an incentive award program that encourages the transfer of assets from transaction static accounts to transaction intensive accounts to obtain the benefits resulting therefrom, and to concentrate assets in transaction intensive accounts that are more active and that will generate or require administering institution services.

It is another object of the present invention to provide a computer architecture and process to implement an incentive award program that provides customers with transaction intensive account services so that the customer will constantly and periodically identify or recognize the administrating institution which is administering the customer accounts.

The present invention is based, in part, on the discovery that these types of incentives are graciously welcomed by customers, and as a result, manual type transactions may be significantly reduced. Consequently, the intensive and costly operations required to process manual transactions may be significantly reduced while electronic transactions are increased. The present invention is also based, in part, on the discovery that the incentive award program may also be used to effectuate debit type electronic transactions eliminating "float" charges previously experienced by the administering institution for extending credit.

Further, the present invention is also based on the discovery of the potential abuses of such an incentive award program. In particular, the present invention includes the recognition of potential check "kiting" fraudulent transactions.

Check "kiting" activities involves the shifting of balances between accounts of two financial institutions that permits the customer to withdraw assets on the "float" of funds. For example, a customer will have two checking accounts. One account has a $1000 balance, and in the other account there is a $100 balance. The customer writes a check on the first account for $900 and immediately deposits the $900 in the second account now leaving $1000 in the second account. The balance for the first account should indicate only $100 is in the account. However, the financial institution will typically show $10000 because the check has not cleared from the first account. The customer then has an artificial $1000 balance in both the first and second accounts permitting the customer to write checks based on this "float" of funds. At the end of the day, the account that notices the problem last because each account is usually in a different financial institution closes the account for writing any more debits will allow checks to keep coming in. Thus, one financial institution will have processed a transaction with no funds to support it, leaving that bank with a loss.

Accordingly, the present invention realizes this problem relating to check kiting, and in accordance therewith, has discovered associated problems relating to electronic transactions when such electronic transactions generate points for an incentive award program. Thus, the present invention discriminates between particular electronic transactions that are easy targets for fraudulent transactions from electronic transactions that are more characteristic of proper or valid electronic transactions awarded points to be used in connection with an incentive award program. For example, one such type of electronic transaction that has been determined should be awarded points is an electronic transaction that is associated with an account that can be easily be credited and debited. One such type of electronic transaction is an electronic transaction validated by the VISA transaction network. In accordance with this design, the incentive award program of the present invention greatly reduces the potential for fraudulent electronic transactions, thereby providing a cost effective and efficient incentive award program.

To achieve these features and advantages, the present invention provides a computer architecture used to implement the incentive award program. In one of the preferred embodiments, the computer architecture used to implement the incentive award program provides an incentive award computer system in an advanced intelligent network based information distribution system environment. The advanced intelligent network includes a central office switching system connected to communication lines including at least one service switching point for selectively providing switched communications between the communication lines, and a network controller arranged for selectively providing control data to effect land line communications. The network controller is also arranged separately from the central office switching system, and is connected to the at least one service switching point through at least one service transfer point arranged to convey control data to effect communications.

The network controller stores preprogrammed call processing data associated with subscribers who are associated with one of the communication lines connected to the central office switching system, and also stores preprogrammed call processing data associated with subscribers. The incentive award computer system provides an award to users participating in the incentive award computer system, and the user maintains a transaction intensive account utilizing manual and automatic transactions and with a supply balance. The incentive award computer system includes a request transaction processing computer system receiving an electronic transaction by a user, determining whether the electronic transaction is a reward eligible transaction, and generating a transaction request when the electronic transaction is determined to be the reward eligible transaction. The incentive award computer system also includes a points calculator processing computer system, responsively connected to the request transaction processing computer system, receiving the transaction request from the request transaction processing computer system, determining a reward responsive to the reward eligible transaction represented in the transaction request, assigning the reward to a user record responsive to reward criteria, and generating a reward record representing the reward. The reward is determined when the reward eligible transaction comprises a new user account electronic transaction, an acquisition electronic transaction, and a supply balance electronic transaction. The acquisition electronic transaction is eligible for the reward to minimize the manual transactions and to stimulate the automatic transactions and to simultaneously eliminate counterfeit purchases effectuated to obtain the reward. The reward record includes a transaction code field, a bonus point field, a bonus switch field, a transaction point field, and a transaction point sign field, a customer status field, and a new account indicator field. The bonus switch field facilitates processing of the bonus point field and the transaction point sign field facilitates the processing of the transaction point field. The customer status field and the new account indicator field facilitate the assignment of the reward to the customer account. The incentive award computer system also includes a points assigning and reporting processing computer system, responsively connected to the points calculator processing computer system, receiving the reward record including the reward from the points assigning and reporting processing system, accumulating the reward for each user record, generating a reward report to the user indicating current and accumulated awards, and providing access to the user record and the reward by the user responsive to predetermined criteria.

In another embodiment of the invention, a method is provided for implementing an incentive award system for providing an award to users participating in the incentive award system. The user maintains a transaction intensive account utilizing manual and automatic transactions and with a supply balance. The incentive award system includes a request transaction processing computer system, a points calculator processing computer system, and a points assigning and reporting processing computer system. The method includes the steps of receiving an electronic transaction by a user, determining whether the electronic transaction is a reward eligible transaction, and generating a transaction request when the electronic transaction is determined to be the reward eligible transaction. The method also includes the steps of determining a reward responsive to the reward eligible transaction represented in the transaction request, assigning the reward to a user record responsive to reward criteria, and generating a reward record representing the reward. The reward is determined when the reward eligible transaction comprises at least one of a new user account electronic transaction, an acquisition electronic transaction, and a supply balance electronic transaction. The acquisition electronic transaction is eligible for the reward to minimize the manual transactions and to stimulate the automatic transactions and to simultaneously eliminate counterfeit purchases effectuated to obtain the reward. The reward record includes a transaction code field, a bonus point field, a bonus switch field, a transaction point field, and a transaction point sign field, a customer status field, and a new account indicator field. The bonus switch field facilitates processing of the bonus point field and the transaction point sign field facilitates the processing of the transaction point field. The customer status field and the new account indicator field facilitate the assignment of the reward to the customer account. The method also includes the steps of accumulating the reward for each user record, generating a reward report to the user indicating current and accumulated awards, and providing access to the user record and the reward by the user responsive to predetermined criteria.

In another embodiment of the invention, an incentive generating and assigning system includes a user interface system, a user verification system, a request transaction processing system, a points calculator processing system and a points posting, assigning and access processing system. The incentive generating and assigning system implements a method of assigning and accessing a reward responsive to a user performance level. The method includes the steps of performing a reward eligible transaction by a user, automatically verifying the user, and generating a transaction request responsive to the performing step. The method also includes the steps of determining a reward responsive to the reward eligible transaction represented in the transaction request, assigning the reward to a user record responsive to reward criteria, and accessing the user record and the reward by the user.

In another embodiment of the invention, the incentive award computer system provides an award to users participating in the incentive award computer system. The user maintains a transaction intensive account utilizing manual and automatic transactions and with a supply balance. The incentive award computer system includes a request transaction processing computer system receiving an electronic transaction by a user, determining whether the electronic transaction is a reward eligible transaction, and generating a transaction request when the electronic transaction is determined to be the reward eligible transaction. The incentive award computer system also includes a points calculator processing computer system, responsively connected to the request transaction processing computer system, receiving the transaction request from the request transaction processing computer system, determining a reward responsive to the reward eligible transaction represented in the transaction request, assigning the reward to a user record responsive to reward criteria, and generating a reward record representing the reward. The reward is determined when the reward eligible transaction comprises at least one of a new user account electronic transaction, an acquisition electronic transaction, and a supply balance electronic transaction. The acquisition electronic transaction is eligible for the reward to minimize the manual transactions and to stimulate the automatic transactions and to simultaneously eliminate counterfeit purchases effectuated to obtain the reward. The reward record includes a transaction code field, a bonus point field, a bonus switch field, a transaction point field, and a transaction point sign field, a customer status field, and a new account indicator field. The bonus switch field facilitates processing of the bonus point field and the transaction point sign field facilitates the processing of the transaction point field. The customer status field and the new account indicator field facilitate the assignment of the reward to the customer account. The incentive award computer system also includes a points assigning and reporting processing computer system, responsively connected to the points calculator processing computer system, receiving the reward record including the reward from the points assigning and reporting processing system, accumulating the reward for each user record, generating a reward report to the user indicating current and accumulated awards, and providing access to the user record and the reward by the user responsive to predetermined criteria.

These, together with other objects and advantages which will be subsequently apparent, reside in the details of construction and operation as more fully hereinafter described and claimed, with reference being had to the accompanying drawings forming a part hereof, wherein like numerals refer to like elements throughout.

BEST MODE FOR CARRYING OUT THE INVENTION

Figure 1:
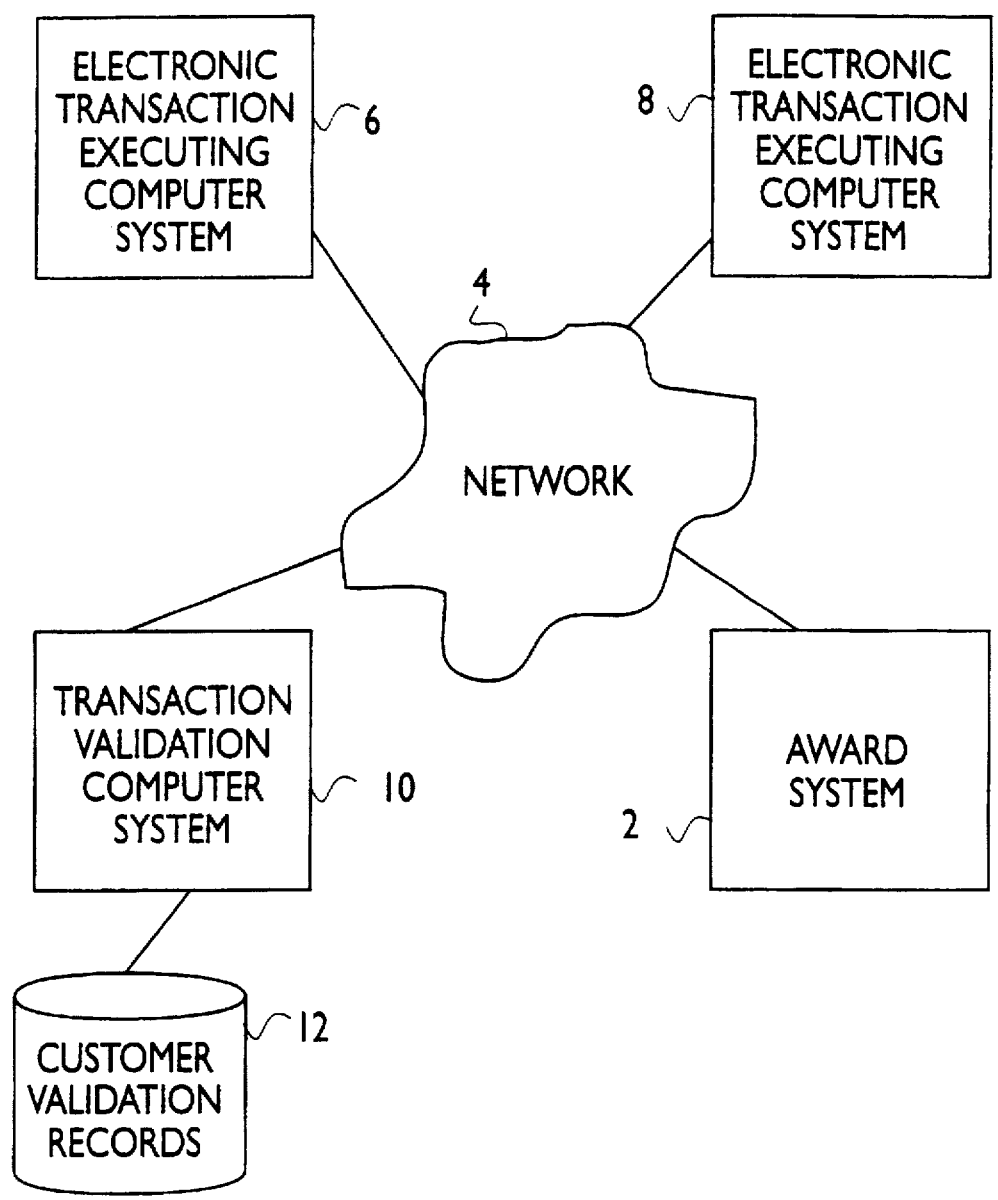
FIG. 1 is a basic block diagram of the computer architecture for the Incentive Award System.

FIG. 1 is a basic block diagram of the computer architecture for the Incentive Award System. In FIG. 1, Award System 2 is connected to network 4 which permits the other elements in the computer system to communicate with one another. Electronic transaction executing computer systems 6 and 8 are also connected to network 4. When an electronic transaction is executed by such computer systems 6 and 8, the electronic transaction is transmitted to network 4. Network 4 then transmits the proposed electronic transaction to transaction validation computer system 10 which determines whether or not the proposed electronic transaction is valid based upon customer validation records stored in data base 12. If the proposed electronic transaction is validated by the transaction validation computer system 10 (for example, that the customer account number is a valid and active number), the transaction is then transmitted to Award System 2. Award system 2 receives the proposed electronic transaction from network 4 and executes the proposed transaction by accessing the pertinent customer accounts and validating the proposed electronic transaction. That is, Award system 2 ensures that sufficient funds are maintained in the customer account to support the proposed electronic transaction. The summary of the electronic transactions are then generated by Award System 2 to determine whether an award will be provided to the customers initiating the electronic transactions.

Figure 2:
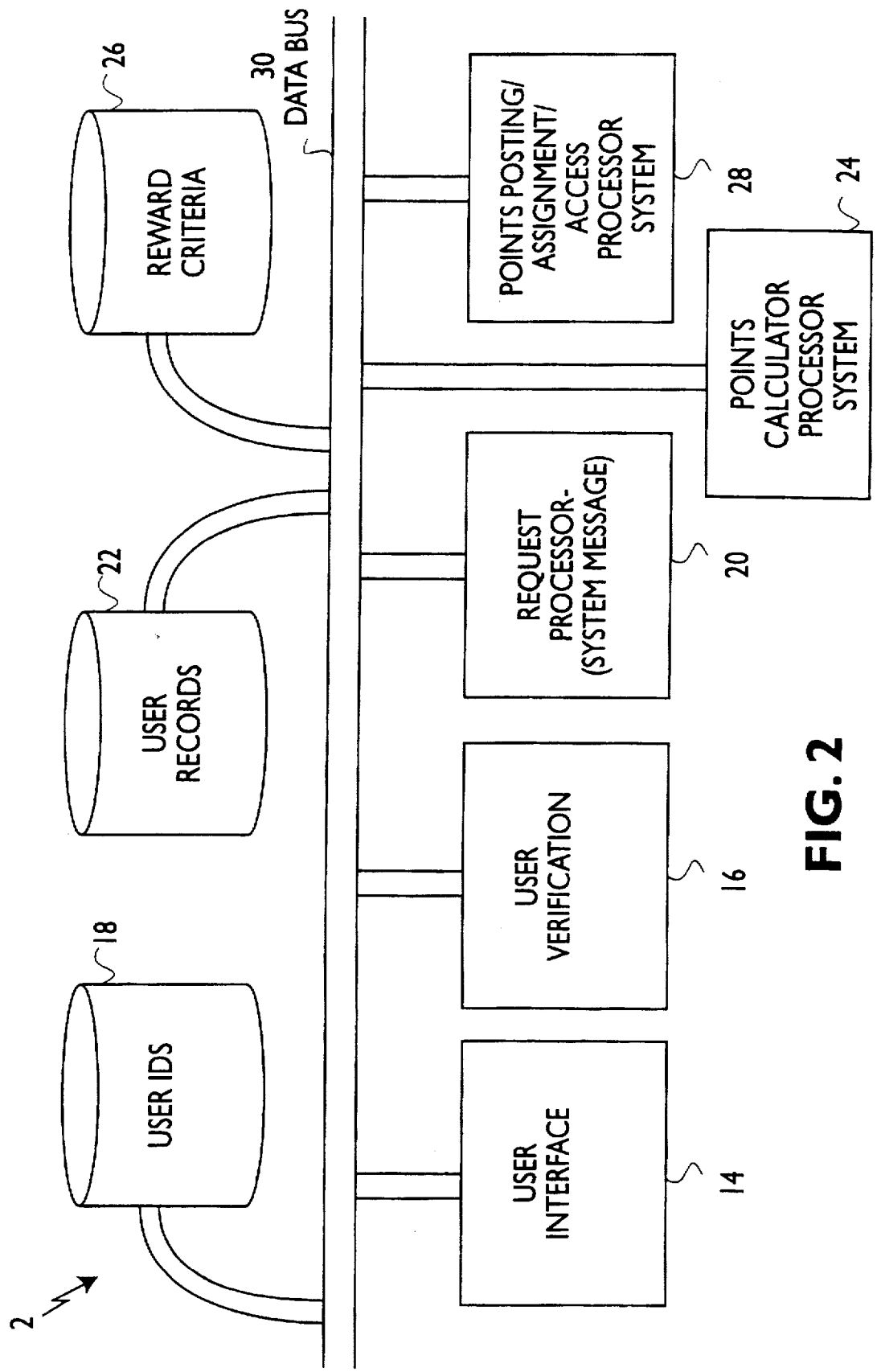
FIG. 2 is a detailed block diagram of the computer architecture for the Incentive Award System illustrated in FIG. 1.

FIG. 2 is a detailed block diagram of the computer architecture for Award System 2 illustrated in FIG. 1. In FIG. 2, Award System 2 is arranged according to a multiple instruction multiple data (MIMD) multiprocessor computer architecture. User interface 14 permits manual access to Award System 2 for various tasks, such as establishing new accounts, etc. Upon receipt of a proposed transaction, user verification system 16 first requests the user identifier to verify that appropriate access is provided to the Award System. User verification system 16 compares the received user identifier (ID) with the user ID's stored in data base 18 via high speed data bus 30.

Assuming that the user has been verified, request processor 20 receives the transaction request and processes the transaction request. For example, for a first time or initial transaction, request processor 20 will create a new user or customer record in data base 22 for posting points to a particular customer account to earn awards. After the transaction has been processed, the specific activities which require analysis for an award determination are transmitted to points calculator processor system 24 via high speed data bus 30 to calculate the specific points to be awarded to the customer account. Points calculator processor system 24 accesses the specific award criteria stored in data base 26 to determine the level and amount of award to be attributed to and for a particular transaction.

Once the points have been determined for a particular transaction, points calculator processor system 24 then transmits the points via high speed data bus 30 to points posting/assignment processor system 28. Points posting/assignment processor system 28 then collates the various points and assigns the points to the correct customer accounts or user records stored in data base 22. Additional details relating to multiple instruction multiple data multiprocessor types of computer architectures are disclosed in greater detail in, for example, U.S. Pat. No. 5,163,131; Boxer, A., Where Buses Cannot Go, IEEE Spectrum, February 1995, pp. 41–45; and Barroso, L. A. et al., RPM: A Rapid Prototyping Engine for Multi-Processor Systems, IEEE Computer, February 1995, pp. 26–34, all of which are incorporated herein by reference. Each of the various processors described above in connection with FIG. 2 are standard processors such as the 486 microprocessor manufactured by various computer manufacturers, including Intel corporation. Similar type of data processors that are capable of performing the functions described for each of the above individual components are may also be used.

Figure 3:
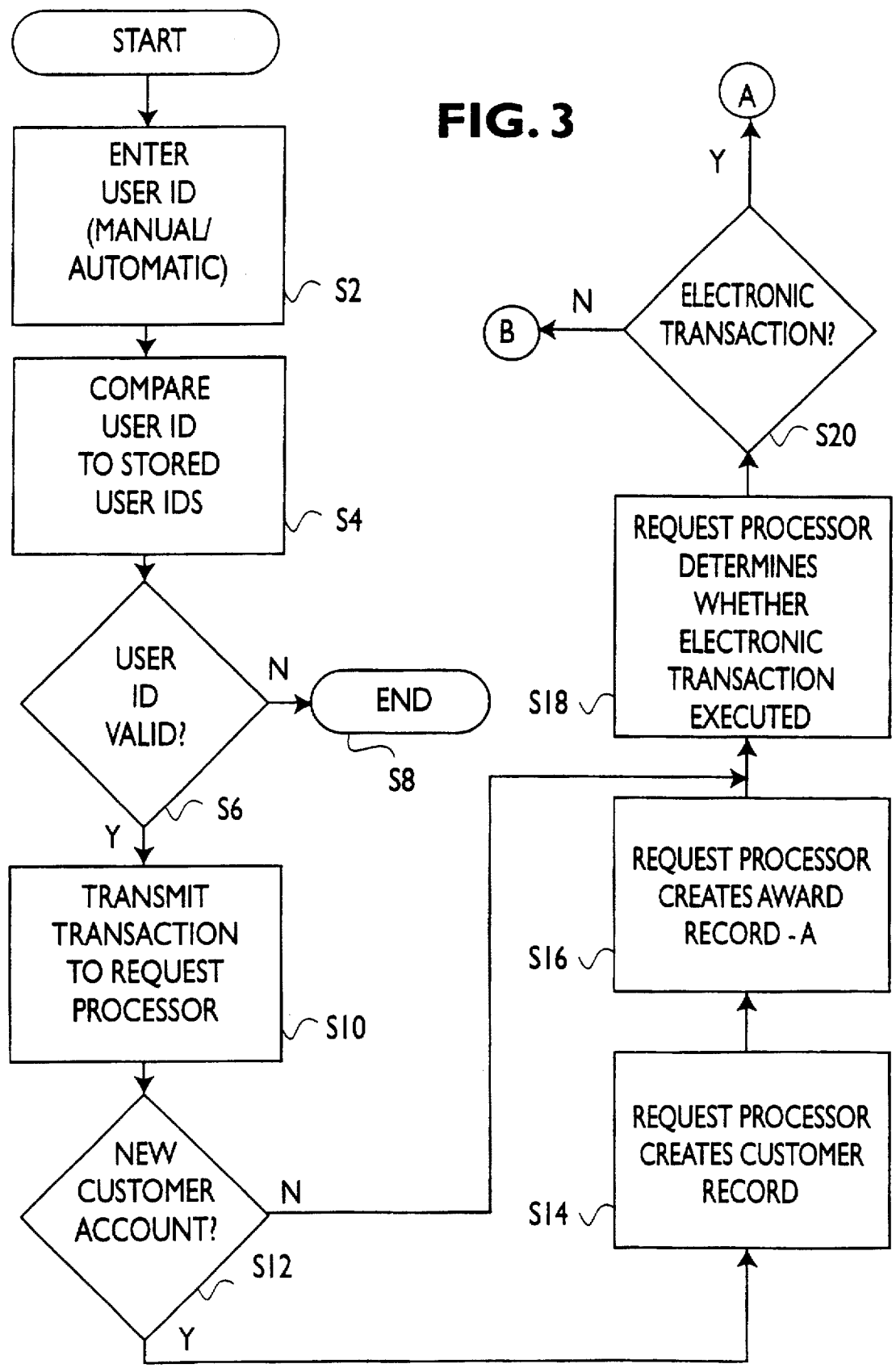
FIGS. 3-5 are flow charts of the computer implemented process of the Incentive Award System.
Figure 4:
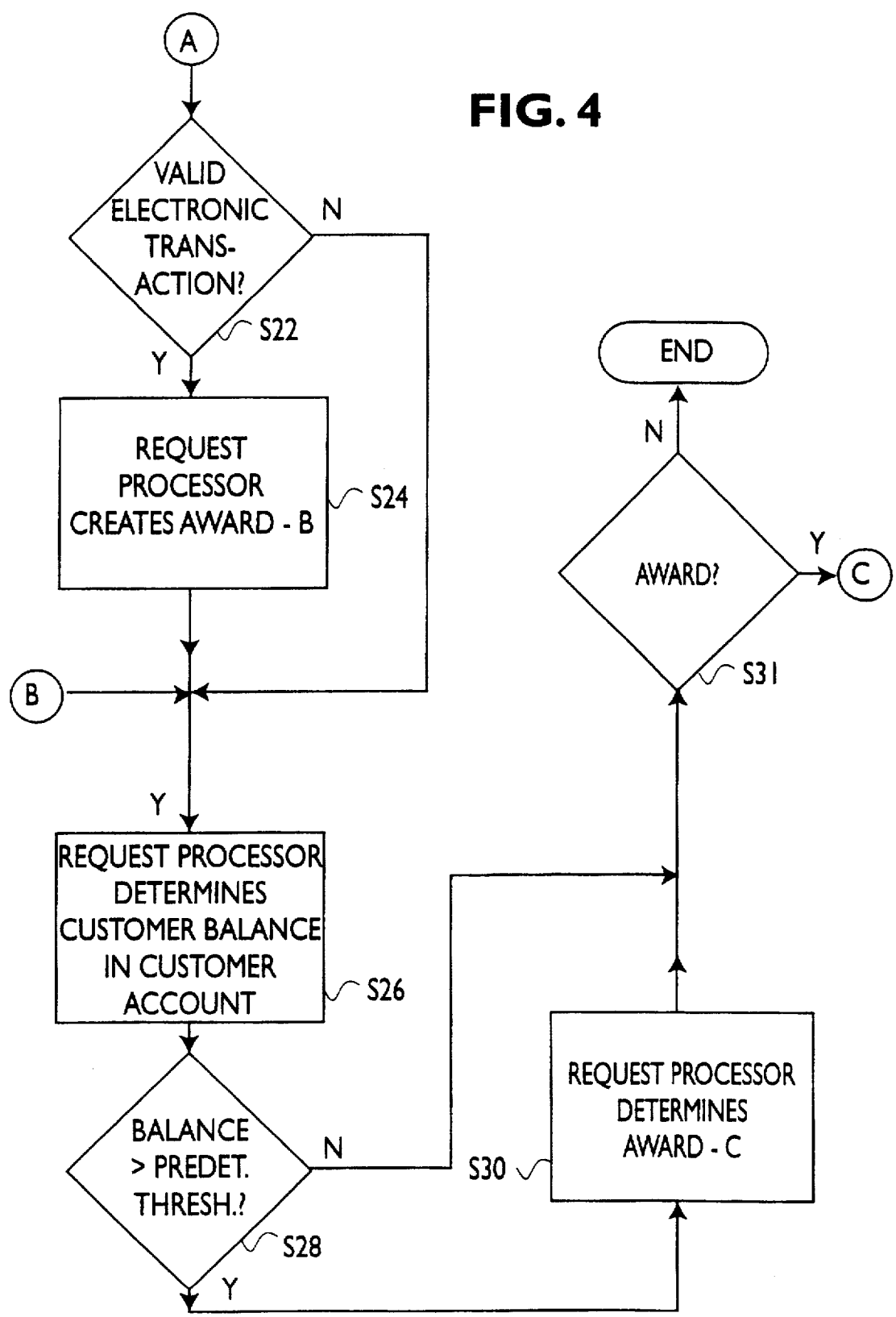
Figure 5:
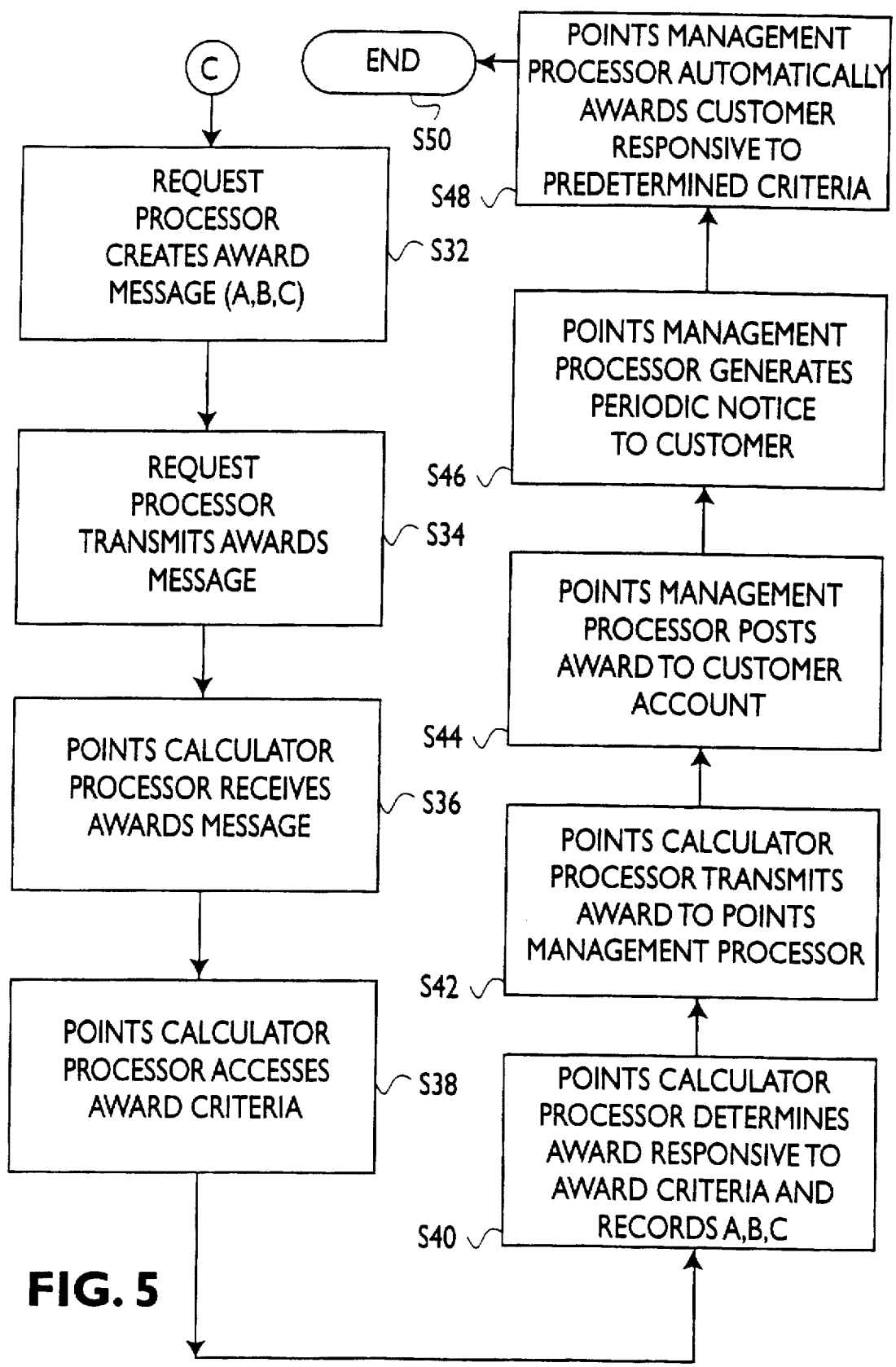

FIGS. 3–5 are flow charts of the computer implemented process of the Incentive Award System. In FIG. 3, a user begins the process by entering the user ID in step S2. The user ID may be for manual access to the incentive Award System to, for example, initiate or establish a new customer account. Alternatively, the user ID may also be automatically transmitted from, for example, network 4 illustrated in FIG. 1 in order to permit network 4 to access the Award System 2 in an automated manner. The user ID is then compared to the valid user ID stored in the user ID data base in step S4. If the user ID is not valid as determined in step S6, the process ends in step S8. If, on the other hand, the user ID is validated in step S6, the transaction is then transmitted to request processor 20 for processing the transaction in step S10.

Request processor 20 then determines whether the transaction is for a new customer account in step S12. If request processor 20 determines that the transaction relates to a new customer account in step S12, request processor then creates a new customer record in step S14, and creates a specific award associated with the establishment of a new customer account in step S16 based upon predetermined reward criteria stored in data base 26.

When request processor 20 determines that transaction does not involve a new customer account in step S12, or when new customer account has been established and a particular award has been assigned to that customer account in step S16, request processor 20 then determines whether the received transaction also includes an electronic transaction which might be eligible for additional rewards in step S18. In step S20, request processor 20 directs process control based on whether the electronic transaction is present in step S18, and if so, determines whether that electronic transaction is a valid transaction for receiving an incentive award in step S22 illustrated in FIG. 4. When the electronic transaction is determined to be valid in step S22, request processor 20 then creates a second award relating to the electronic transaction in step S24. Valid transactions are generally any type of electronic transaction conducted and associated with a customer account excluding direct withdrawals using the ATM Network using standard POS and InterLink type transactions, cash advance transactions or service charge waiver transactions. While the specific electronic transactions have been excluded according the principles of the present invention, other types of electronic transactions might be excluded or included. For example, automatic deposit type transactions or automatic mortgage type electronic transactions may also be included or excluded depending upon the specific circumstances or predetermined rules established for the Incentive Award System. Further, investment related transactions, standard loans and/or retail product type electronic transactions can also be used as a valid or invalid type transaction for determining the specific points to be awarded to a customer account in step S24.

If no electronic transaction is determined or the electronic transaction is not valid, request processor 20 then determines whether a customer balance exists in the customer account in step S26. If the customer balance exceeds a predetermined threshold balance as determined in step S28, request processor 20 then determines an additional award in step S30 to be assigned to the customer account. Request processor 20 then determines whether any award has been calculated for the customer account in step S31, and if not, the process then ends. If an award has been assigned to the customer account in step S31, request processor then creates an award message comprising one or more of the various awards in step S32 and transmits the awards message in step S34. Points calculator processor 24 receives the awards message in step S36 and accesses specific award criteria in step S38.

The specific format of the data contained in the awards message transmitted between the various components of computer implemented Incentive Awards System is illustrated in the accompanying table. Advantageously, the data format and arrangement of the data illustrated in this table facilitates the efficient processing of various transactions including the electronic transactions to determine whether awards should be assigned a particular customer account, and the amount of such awards. For example, separate transaction, points and bonus fields are created for each record that is created depending on the specific award.

Points calculator processor 24 then determines the award responsive to specific award criteria and particular award records created by the request processor 20 in step S40. Points calculator processor 24 then transmits the award to points management processor 28 in step S42, and points management processor 28 posts the particular awards to the customer account in step S44. Point management processor 28 then generates periodic notices to the customer in step S46 which summarizes the awards which have been assigned to the customer account on a periodic basis. Further, points management processor 28 may also automatically apply an award to a customer responsive to predetermined criteria in step S48. Such predetermined criteria might be based on a particular time interval or a particular level of award which has been accumulated, or other types of predetermined criteria. The computer implemented process then ends in step S50.

Figure 6:
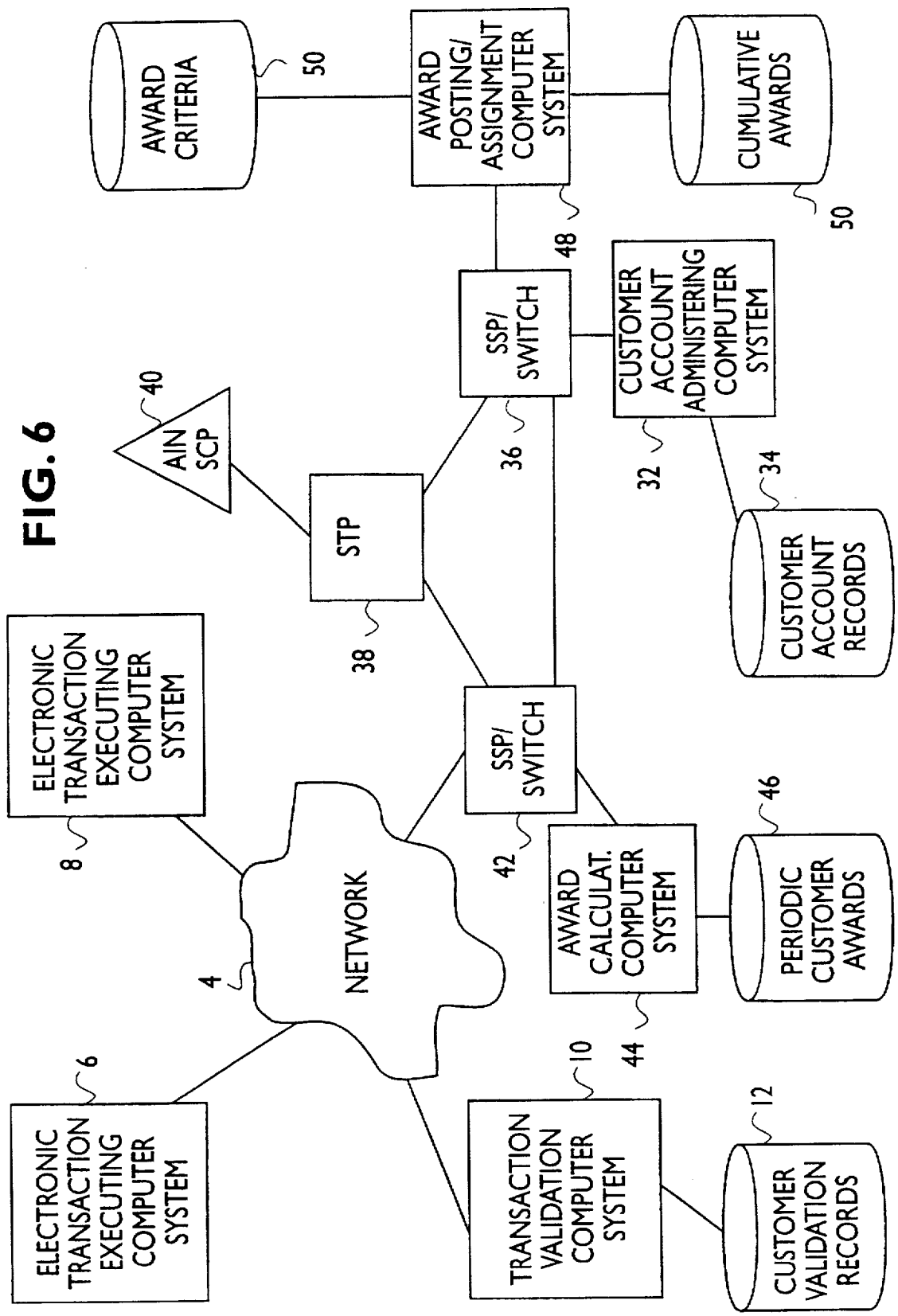
FIG. 6 is a basic block diagram of another embodiment of the computer architecture for the Incentive Award System utilizing an advanced intelligent network public switched telephone network.

FIG. 6 is a block diagram of another embodiment of the computer architecture for the Incentive Award System. FIG. 6 illustrates the use of the inventive award system in a distributed computing environment utilizing the advanced intelligent network (AIN) public switched telephone network (PSTN) to communicate between various components within the distributed computing system. In FIG. 6, the incentive award computer architecture is arranged using the advanced intelligent network architecture to facilitate the implementation of the Incentive Award Program across a wide geographic area.

In FIG. 6, the components of the computer architecture of the incentive Award System that are the same as previously described in connection with FIGS. 1-2 are only briefly discussed. The AIN Switching Network uses one or more central office switches which are individually controlled by a service switching point (SSP) computer system. The central office switches may be the class 4/5 switches, and are generally located throughout a state or region served by a telephone operating company. Local telephone lines connect the central office switch to individual telephone terminals in each geographic area, for example, to the plain old telephone service (POTS) telephones or to data terminals such as modems used to transmit digital data over telephone lines.

The central office switch connects, via trunk circuits, to one or more remote central offices and/or between a central office and a mobility controller. Each central office has a common channel inter-office signaling (CCIS) type data link going to a signal transfer point (STP). CC! S type data links provide data communication for standard and related special service processing. Also, CCIS packets which data links connect the STP to a service control point (SCP) 40.

In general, the data call is initiated by one or more of the various components of the computer architecture of the Incentive Award Program. For example, network 4 can generate a data call to transmit the occurrence of an electronic transaction to service switching point/switch 42. Service switching point/switch 42 may then transfer the data to service switching point/switch 36 which then transfers the data to a customer account administering computer system 32 for processing the transaction. Administering computer system 32 then transmits the processed transaction to award calculating computer system 44 via service switching point/ switches 36 and 42.

Award calculating computer system 44 then determines the periodic awards based upon the data stored in data base 46. Award calculating computer system 44 then transmits the calculated awards to the award posting/assignment computer system 48 via service switching point/switches 42 and 36. Award posting/assignment computer system 48 then determines specific awards to be provided to a customer based upon data stored in data base 50 and collates and accumulates the awards data base 52. Thus, according to this advanced intelligent network based computer architecture, the various components of the Incentive Award System can be distributed throughout a wide geographic area to facilitate and provide the ability to have specialized functions being performed by different computer providers, thereby maximizing the efficiency or minimizing the cost of the Incentive Award System.

In general, the operation of the Incentive Award System is as follows: One of the various components of the computer architecture in the Incentive Award System generates a "call" or data transmission to a destination component using, optionally, a predesignated set of digits which activate a dialed line number (DLN) trigger on the receiving switch. The DLN trigger may be activated either at the beginning of the call or afterward as will be discussed, when the SCP has identified that the call should be routed to a predetermined destination. Control of the call is then passed from the SSP/switch to the STP 38 which then transmits control to the AIN SCP 40. The AIN SCP 40 then executes a customer record which performs a predesignated routing function to facilitate and expedite the data transmission from the various components in the Incentive Award System.

Once the AIN SCP 40 executes the customer record, the AIN SCP 40 then instructs the switch, for example, SSP/ switch 42, to route the call to the appropriate destination. In this manner, the advanced intelligent network computer architecture used within the Incentive Award System facilitates the communication between the various components of the Incentive Award System. Consequently, the advanced intelligent network based Incentive Award Computer System is able to more efficiently and effectively transmit data between components thereof, allowing separate providers of the various components.

Advantageously, the data format of the award record as described in the accompanying table is arranged so that a single customer record is created depending on the type of bonus which is awarded to the participant in the incentive award program. Accordingly, when, for example, an award is issued as a result of an eligible electronic transaction, the number of points which have been calculated for the electronic transaction are inserted in the points field, and the transaction code is filed with a specific predesignated number to identify the type of bonus transaction (e.g., the code 002 indicating a positive amount of bonus electronic transactions.) Other data formats may also be used as well.

Figure 7:
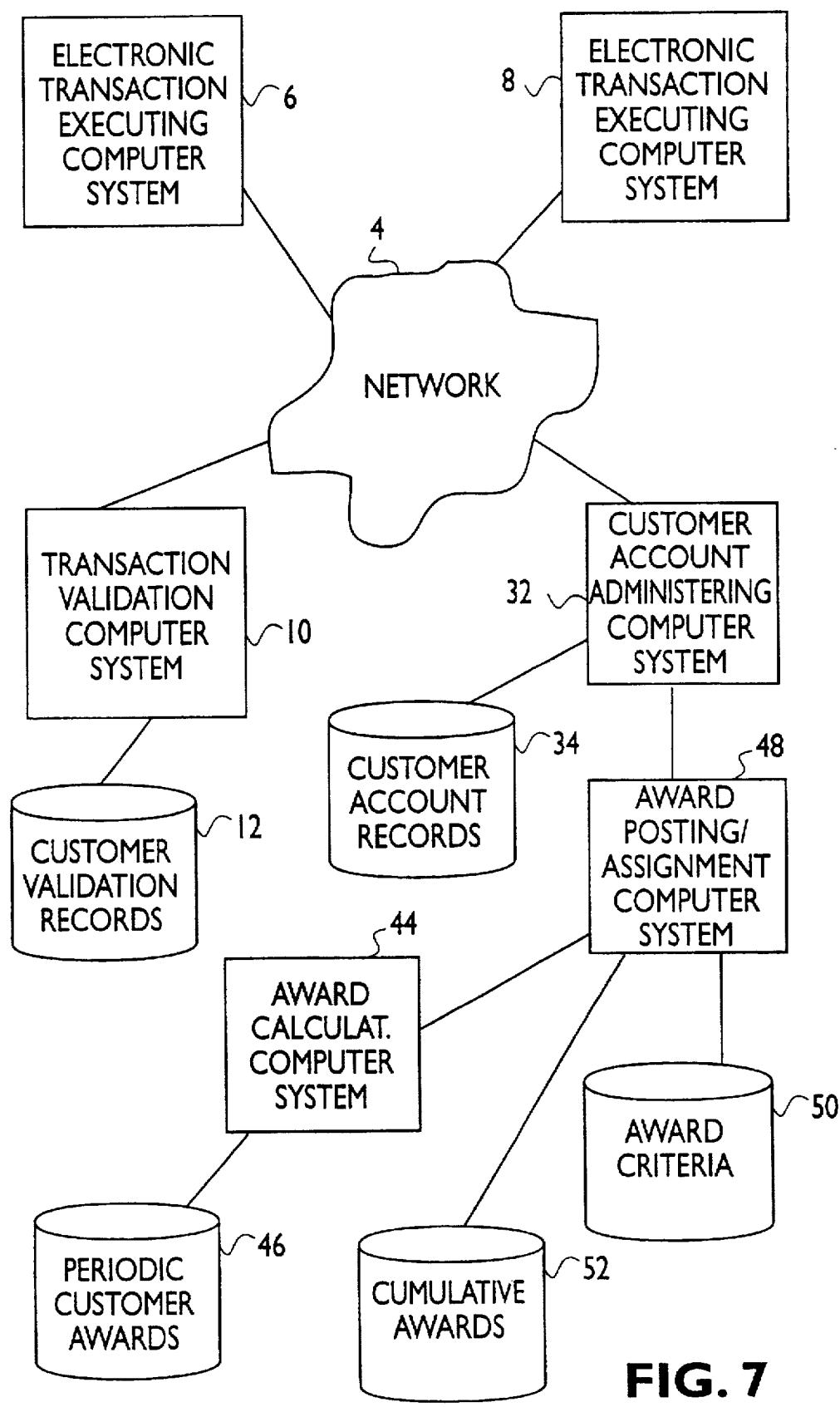
FIG. 7 is a basic block diagram of another embodiment of the computer architecture for the Incentive Award System.
Figure 8:
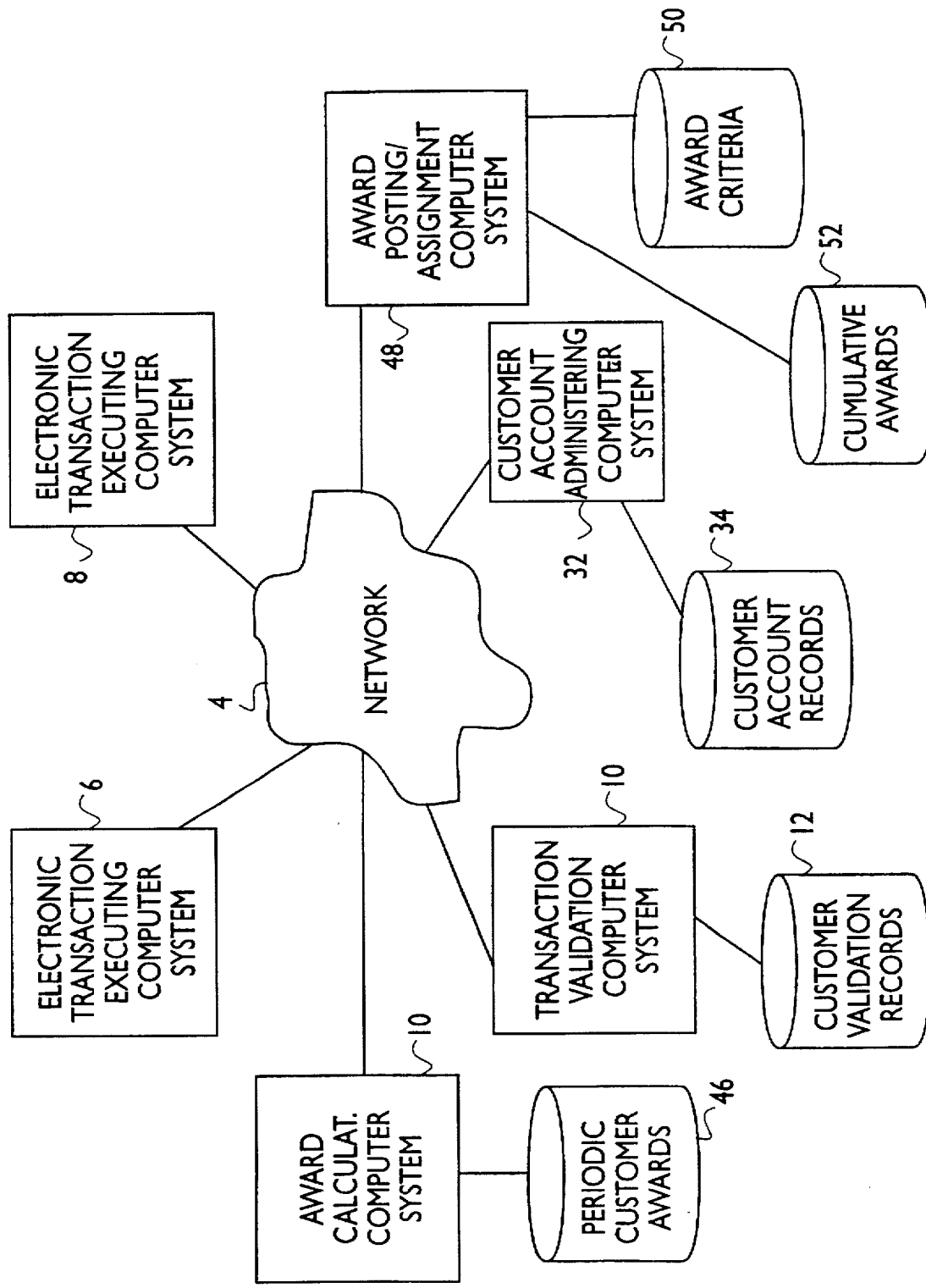
FIG. 8 is a basic block diagram of another embodiment of the computer architecture for the incentive Award System.
Figure 9:
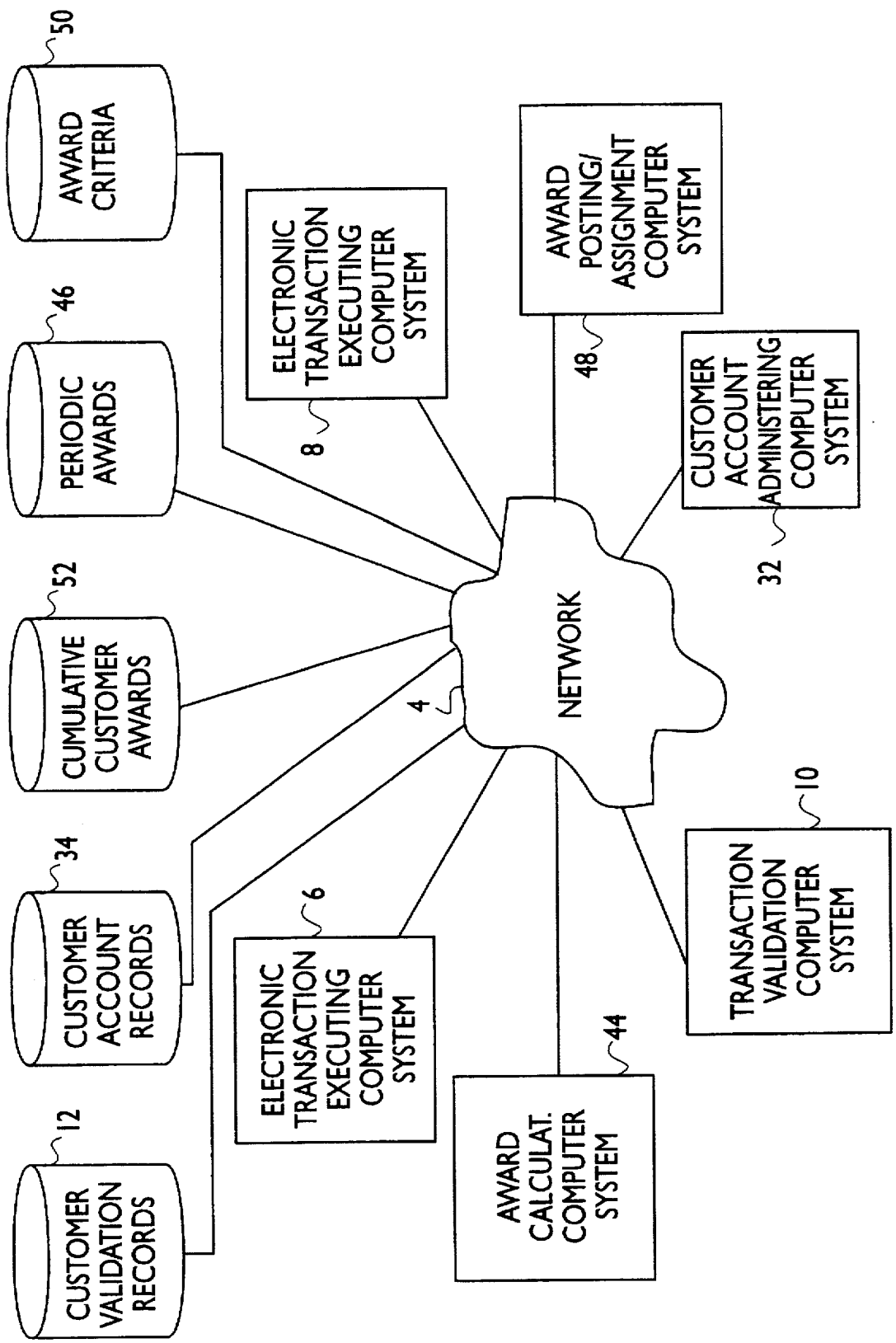
FIG. 9 is a basic block diagram of another embodiment of the computer architecture for the Incentive Award System.

FIG. 7 is a basic block diagram of another embodiment of the computer architecture for the Incentive Award System. FIG. 7 illustrates a distributed data base system where various computer systems are only able to communicate with adjacent computer systems for obtaining the necessary information. FIG. 7 illustrates the situation when the award calculating computer system 44 receives messages from the customer account administering computer system 32 via awards posting/assignment computer system 48. Alternatively, the award calculating computer system 44 can receive messages directly from the customer account administering computer system 32. Further, the award calculating computer system 44 and the customer account administering computer system 32 can be combined in one computer system that administers and calculates points on a non-cumulative basis of customer awards. FIG. 8 is a basic block diagram of another embodiment of a computer architecture for the incentive Award System where all components in the incentive Award System communicate to other components via network 4 while maintaining a distributed data base system. In accordance with this embodiment, each component that generates or manages data stores that data locally while permitting other components access to such data when required. Finally, FIG. 9 is a basic block diagram of another embodiment of the computer architecture for the Incentive Award System similar to FIG. 8, except all data bases containing data relating to the Incentive Award System are accessed via network 4 from a central or global location. In accordance with this embodiment, network 4 performs the coordination and administration of which component in the Incentive Award System has access to which database using standard predetermined criteria.

The above embodiments are illustrative of preferred designs of the Incentive Award System. Other embodiments are also possible. For example, one or more of the above components may be implemented as a software module in a large software program. Further, the communications between components may be effectuated by storing the generated data on a storage medium, such as a tape, etc., and downloading the data from the storage medium to another component.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. In an advanced intelligent network based information distribution system including a central office switching system connected to communication lines, a computer implemented method of providing an incentive award system for providing an award to users participating in the incentive award system and administering by an institution, the user maintaining a transaction intensive account utilizing manual and automatic transactions and with a supply balance, said method comprising the steps of:

(a) receiving an electronic transaction by a user;

(b) determining whether the electronic transaction is a reward eligible transaction;

(c) generating a transaction request when the electronic transaction is determined to be the reward eligible transaction;

(d) determining a reward responsive to the reward eligible transaction represented in the transaction request;

(e) assigning the reward to a user record responsive to reward criteria;

(f) generating a reward record representing the reward, the reward being determined when the reward eligible transaction comprises at least one of a new user account electronic transaction, an acquisition electronic transaction, and a supply balance electronic transaction, the reward eligible transaction being applied against the transaction intensive account utilizing the manual and the automatic transactions and being deducted from the supply balance;

(g) accumulating the reward for each user record;

(h) generating a reward report to the user indicating current and accumulated awards;

(i) providing access to the user record and the reward by the user responsive to predetermined criteria; and (j) applying the reward eligible transaction against the transaction intensive account utilizing the manual and the automatic transactions and the eligable transaction being deducted from the supply balance immediately and in real-time by said institution without incurring float charges while checking float of funds of said supply balance at the time of purchase before awarding to the user said reward.

2. A computer implemented method of providing an incentive award system for providing an award to users participating in the incentive award system according to claim 1, wherein said generating step (f) further comprises the step of generating a reward record representing the reward, the reward being determined when the reward eligible transaction comprises at least one of a new user account electronic transaction, an acquisition electronic transaction, and a supply balance electronic transaction, the reward eligible transaction being applied against the transaction intensive account utilizing the manual and the automatic transactions and being deducted from the supply balance, and the acquisition electronic transaction is considered eligible for the reward to minimize the manual transactions and to stimulate the automatic transactions and to simultaneously eliminate counterfeit purchases effectuated to obtain the reward.

3. A computer implemented method of providing an incentive award system for providing an award to users participating in the incentive award system according to claim 1, wherein said generating step (f) further comprises the step of generating a reward record representing the reward, the reward being determined when the reward eligible transaction comprises at least one of a new user account electronic transaction, an acquisition electronic transaction, and a supply balance electronic transaction, the reward eligible transaction being applied against the transaction intensive account utilizing the manual and the automatic transactions and being deducted from the supply balance, and the reward record includes a transaction code field, a bonus point field, a bonus switch field, a transaction point field, and a transaction point sign field, a customer status field, and a new account indicator field.

4. A computer implemented method of providing an incentive award system for providing an award to users participating in the incentive award system according to claim 3, wherein the bonus switch field facilitates processing of the bonus point field and the transaction point sign field facilitates the processing of the transaction point field, and wherein the customer status field and the new account indicator field facilitate the assignment of the reward to the customer account.

5. A computer implemented method of providing an incentive award system for providing an award to users participating in the incentive award system according to claim 1, wherein when the user accumulates a sufficient number of points in the accumulated reward, the user is rewarded with an airline ticket.

6. A computer implemented method of providing an incentive award system for providing an award to users participating in the incentive award system according to claim 1, wherein each point awarded to the user represents a mileage point for a frequent flyer airline program awarding free airline tickets.

7. A computer implemented method of providing an incentive award system for providing an award to users participating in the incentive award system according to claim 1, further comprising the step of inserting in the reward report generated by said generating step (h) additional promotional materials promoting services and products of a sponsoring institution of the reward.

8. A computer implemented incentive award system for providing an award to users participating in the incentive award system according to claim 1, wherein said award posting and report generating computer system inserts in the reward report additional promotional materials promoting services and products of a sponsoring institution of the reward.

9. A computer implemented incentive award system for providing an award to users participating in the incentive award system and administering by an institution, the user maintaining a transaction intensive account utilizing manual and automatic transactions and with a supply balance, said system comprising:

a request processing and award calculating computer system receiving an electronic transaction initiated by a user, determining whether the electronic transaction is a reward eligible transaction, determining a reward responsive to the reward eligible transaction, assigning the reward to a user record responsive to reward criteria, and generating a reward record representing the reward, wherein the reward is determined when the reward eligible transaction comprises at least one of a new user account electronic transaction, an acquisition electronic transaction, and a supply balance electronic transaction, the reward eligible transaction being applied against the transaction intensive account utilizing the manual and the automatic transactions and being deducted from the supply balance; and an award posting and report generating computer system, operatively connected to said request processing and award calculating computer system, said award posting and report generating computer system accumulating the reward for each user record, generating a reward report to the user indicating current and accumulated awards, and providing access to the user record and the reward by the user responsive to predetermined criteria, and said award posting and report generating computer system applies the reward eligible transaction against the transaction intensive account utilizing the manual and the automatic transactions and deducts from the supply balance the eligible transaction immediately and in real-time without incurring float charges while checking float of funds of said supply balance at the time of purchase before awarding to the user said reward.

10. A computer implemented incentive award system for providing an award to users participating in the incentive award system according to claim 9, wherein said request processing and award calculating computer system determines the acquisition electronic transaction eligible for the reward to minimize the manual transactions and to stimulate the automatic transactions and to simultaneously eliminate counterfeit purchases effectuated to obtain the reward.

11. A computer implemented incentive award system for providing an award to users participating in the incentive award system according to claim 9, wherein said request processing and award calculating computer system generates the reward record including a transaction code field, a bonus point field, a bonus switch field, a transaction point field, and a transaction point sign field, a customer status field, and a new account indicator field.

12. A computer implemented incentive award system for providing an award to users participating in the incentive award system according to claim 11, wherein the bonus switch field facilitates processing of the bonus point field and the transaction point sign field facilitates the processing of the transaction point field, and wherein the customer status field and the new account indicator field facilitate the assignment of the reward to the customer account.

13. A computer implemented incentive award system for providing an award to users participating in the incentive award system according to claim 9, wherein when the user accumulates a sufficient number of points in the accumulated reward, the user is rewarded with an airline ticket.

14. A computer implemented incentive award system for providing an award to users participating in the incentive award system according to claim 9, wherein each point awarded to the user represents a mileage point for a frequent flyer airline program awarding free airline tickets.

15. A method of providing an incentive award system for providing an award to users participating in the incentive award system and administering by an institution, the user maintaining a transaction intensive account utilizing manual and automatic transactions and with a supply balance, and the incentive award system including a request transaction and points calculator processing computer system, and a points assigning and reporting processing computer system, said method comprising the steps of:

(a) receiving an electronic transaction by a user;

(b) determining whether the electronic transaction is a reward eligible transaction;

(c) generating a transaction request when the electronic transaction is determined to be the reward eligible transaction;

(d) determining a reward responsive to the reward eligible transaction represented in the transaction request;

(e) assigning the reward to a user record responsive to reward criteria;

(f) generating a reward record representing the reward, the reward being determined when the reward eligible transaction comprises at least one of a new user account electronic transaction, an acquisition electronic transaction, and a supply balance electronic transaction, wherein the acquisition electronic transaction is considered eligible for the reward to minimize the manual transactions and to stimulate the automatic transactions and to simultaneously eliminate counterfeit purchases effectuated to obtain the reward, wherein the reward record includes a transaction code field, a bonus point field, a bonus switch field, a transaction point field, and a transaction point sign field, a customer status field, and a new account indicator field, wherein the bonus switch field facilitates processing of the bonus point field and the transaction point sign field facilitates the processing of the transaction point field, wherein the customer status field and the new account indicator field facilitate the assignment of the reward to the customer account;

(g) accumulating the reward for each user record;

(h) generating a reward report to the user indicating current and accumulated awards;

(i) providing access to the user record and the reward by the user responsive to predetermined criteria; and (j) applying the reward eligible transaction against the transaction intensive account utilizing the manual and the automatic transactions and the eligible transaction being deducted from the supply balance immediately and in real-time by said institution without incurring float charges while checking float of funds of said supply balance at the time of purchase before awarding to the user said reward.

16. A computer implemented method of providing an incentive award system for providing an award to users participating in the incentive award system according to claim 15, wherein said generating step (f) further comprises the step of generating a reward record representing the reward, the reward being determined when the reward eligible transaction comprises at least one of a new user account electronic transaction, an acquisition electronic transaction, and a supply balance electronic transaction, the reward eligible transaction being applied against the transaction intensive account utilizing the manual and the automatic transactions and being deducted from the supply balance, and the acquisition electronic transaction is considered eligible for the reward to minimize the manual transactions and to stimulate the automatic transactions and to simultaneously eliminate counterfeit purchases effectuated to obtain the reward.

17. A computer implemented method of providing an incentive award system for providing an award to users participating in the incentive award system according to claim 15, wherein said generating step (f) further comprises the step of generating a reward record representing the reward, the reward being determined when the reward eligible transaction comprises at least one of a new user account electronic transaction, an acquisition electronic transaction, and a supply balance electronic transaction, the reward eligible transaction being applied against the transaction intensive account utilizing the manual and the automatic transactions and being deducted from the supply balance, and the reward record includes a transaction code field, a bonus point field, a bonus switch field, a transaction point field, and a transaction point sign field, a customer status field, and a new account indicator field.

18. A computer implemented method of providing an incentive award system for providing an award to users participating in the incentive award system according to claim 17,
wherein the bonus switch field facilitates processing of the bonus point field and the transaction point sign field facilitates the processing of the transaction point field, and
wherein the customer status field and the new account indicator field facilitate the assignment of the reward to the customer account.

19. A computer implemented method of providing an incentive award system for providing an award to users participating in the incentive award system according to claim 15, wherein when the user accumulates a sufficient number of points in the accumulated reward, the user is rewarded with an airline ticket.

20. A computer implemented method of providing an incentive award system for providing an award to users participating in the incentive award system according to claim 15, wherein each point awarded to the user represents a mileage point for a frequent flyer airline program awarding free airline tickets.

21. A computer implemented method of providing an incentive award system for providing an award to users participating in the incentive award system according to claim 15, further comprising the step of inserting in the reward report generated by said generating step (h) additional promotional materials promoting services and products of a sponsoring institution of the reward.

22. A computer implemented method of providing an incentive award system for providing an award to users participating in the incentive award system and administering by an institution, the user maintaining a transaction intensive account utilizing manual and automatic transactions and with a supply balance, said method comprising the steps of:

(a) receiving an electronic transaction by a user;

(b) determining whether the electronic transaction is a reward eligible transaction;

(c) generating a transaction request when the electronic transaction is determined to be the reward eligible transaction;

(d) determining a reward responsive to the reward eligible transaction represented in the transaction request;

(e) assigning the reward to a user record responsive to reward criteria;

(f) generating a reward record representing the reward;

(g) accumulating the reward for each user record;

(h) generating a reward report to the user indicating current and accumulated awards;

(i) providing access to the user record and the reward by the user responsive to predetermined criteria; and (j) applying the reward eligible transaction against the transaction intensive account utilizing the manual and the automatic transactions and the eligible transaction being deducted from the supply balance immediately and in real-time by said institution without incurring float charges while checking float of funds of said supply balance at the time of purchase before awarding to the user said reward.

23. A computer implemented method of providing an incentive award system for providing an award to users participating in the incentive award system according to claim 22, wherein said generating step (f) further comprises the step of determining the reward when the reward eligible transaction comprises at least one of a new user account electronic transaction, an acquisition electronic transaction, and a supply balance electronic transaction, the reward eligible transaction being applied against the transaction intensive account utilizing the manual and the automatic transactions and being deducted from the supply balance.

24. A computer implemented method of providing an incentive award system for providing an award to users participating in the incentive award system according to claim 23, wherein said generating step (f) further comprises the step of generating a reward record representing the reward, the reward being determined when the reward eligible transaction comprises at least one of a new user account electronic transaction, an acquisition electronic transaction, and a supply balance electronic transaction, the reward eligible transaction being applied against the transaction intensive account utilizing the manual and the automatic transactions and being deducted from the supply balance, and the acquisition electronic transaction is considered eligible for the reward to minimize the manual transactions and to stimulate the automatic transactions and to simultaneously eliminate counterfeit purchases effectuated to obtain the reward.

25. A computer implemented method of providing an incentive award system for providing an award to users participating in the incentive award system according to claim 23, wherein said generating step (f) further comprises the step of generating a reward record representing the reward, the reward being determined when the reward eligible transaction comprises at least one of a new user account electronic transaction, an acquisition electronic transaction, and a supply balance electronic transaction, the reward eligible transaction being applied against the transaction intensive account utilizing the manual and the automatic transactions and being deducted from the supply balance, and the reward record includes a transaction code field, a bonus point field, a bonus switch field, a transaction point field, and a transaction point sign field, a customer status field, and a new account indicator field.

26. A computer implemented method of providing an incentive award system for providing an award to users participating in the incentive award system according to claim 25, wherein the bonus switch field facilitates processing of the bonus point field and the transaction point sign field facilitates the processing of the transaction point field, and wherein the customer status field and the new account indicator field facilitate the assignment of the reward to the customer account.

27. A computer implemented method of providing an incentive award system for providing an award to users participating in the incentive award system according to claim 22, wherein when the user accumulates a sufficient number of points in the accumulated reward, the user is rewarded with an airline ticket.

28. A computer implemented method of providing an incentive award system for providing an award to users participating in the incentive award system according to claim 22, wherein each point awarded to the user for the reward represents a mileage point for a frequent flyer airline program awarding free airline tickets.

29. A computer implemented method of providing an incentive award system for providing an award to users participating in the incentive award system according to claim 22, further comprising the step of inserting in the reward report generated by said generating step (h) additional promotional materials promoting services and products of a sponsoring institution of the reward.

* * * * *